(12) United States Patent
Ellis

(10) Patent No.: US 9,921,614 B2
(45) Date of Patent: Mar. 20, 2018

(54) POWER ADAPTER UNIT WITH INTEGRATED INPUT/OUTPUT INTERFACE, AND PORTABLE ELECTRONIC DEVICE WITH STORAGE RECESS FOR MULTIFUNCTION POWER ADAPTER

(71) Applicant: AQUATERRA LIMITED, Tetbury, Gloucestershire (GB)

(72) Inventor: Julian Richard Ellis, Tetbury (GB)

(73) Assignee: AQUATERRA LIMITED, Tetbury Gloucestershire (GB)

( * ) Notice: Subject to any disclaimer, the term of this patent is extended or adjusted under 35 U.S.C. 154(b) by 8 days.

(21) Appl. No.: 15/025,338

(22) PCT Filed: Oct. 1, 2014

(86) PCT No.: PCT/GB2014/052968
§ 371 (c)(1),
(2) Date: Mar. 28, 2016

(87) PCT Pub. No.: WO2015/049514
PCT Pub. Date: Apr. 9, 2015

(65) Prior Publication Data
US 2016/0209885 A1    Jul. 21, 2016

(30) Foreign Application Priority Data
Oct. 4, 2013  (GB) .................................. 1317624.3

(51) Int. Cl.
*G06F 1/16*   (2006.01)
*G06F 1/18*   (2006.01)
(Continued)

(52) U.S. Cl.
CPC .......... *G06F 1/1684* (2013.01); *G06F 1/1613* (2013.01); *G06F 1/1656* (2013.01);
(Continued)

(58) Field of Classification Search
CPC ...... H02J 2007/50; G06F 1/26; G06F 1/1684; G06F 1/1656; G06F 1/50; G06F 1/189;
(Continued)

(56) References Cited

U.S. PATENT DOCUMENTS 4,927,986 A    5/1990  Daly
5,126,955 A *  6/1992  Tomoda ................ G06F 1/1616
                                                           345/163
(Continued)

FOREIGN PATENT DOCUMENTS

CN    201075534 Y    6/2008
CN    201113109 Y    9/2008
(Continued)

*Primary Examiner* — Dion R Ferguson
*Assistant Examiner* — Amir Jalali
(74) *Attorney, Agent, or Firm* — Leason Ellis LLP (57) ABSTRACT

A multifunctional adapter or interface unit for a portable electronic device, the adapter unit being stored or stowable within the portable electronic device and being operable as a power adaptor, user input/output device, and/or data transfer unit. The power adaptor includes a plug body with a retractable tray for storing a user input/output device, e.g. a peripheral device such as earphones.

20 Claims, 8 Drawing Sheets

(51) Int. Cl.
*H01R 31/06* (2006.01)
*H04M 1/02* (2006.01)

(52) U.S. Cl.
CPC ........... *G06F 1/189* (2013.01); *H01R 31/065* (2013.01); *H04M 1/0258* (2013.01); *H04M 1/0274* (2013.01)

(58) Field of Classification Search
CPC . H04M 1/0202; H04M 1/0258; H04M 1/0274
USPC ................... 361/679.02, 679.4, 679.55, 725; 455/575.1, 347
See application file for complete search history.

(56) References Cited

U.S. PATENT DOCUMENTS

| | | | |
|---|---|---|---|
| 5,726,684 A * | 3/1998 | Blankenship | G06F 1/1616 345/163 |
| 5,906,506 A * | 5/1999 | Chang | G06F 1/1616 439/500 |
| 5,906,509 A * | 5/1999 | Wu | H01R 29/00 439/518 |
| 6,035,214 A | 3/2000 | Henderson | |
| 6,392,634 B1 * | 5/2002 | Bowers | G06F 1/1616 345/163 |
| 6,419,504 B1 * | 7/2002 | Nelson | H01R 13/652 439/103 |
| 7,128,615 B1 | 10/2006 | Liao | |
| 8,870,601 B2 * | 10/2014 | Lee | H01R 27/00 439/131 |
| 8,988,098 B2 * | 3/2015 | Partee | G01R 31/40 320/132 |
| 9,093,848 B2 * | 7/2015 | Miller | H02J 7/0027 |
| 2002/0168891 A1 * | 11/2002 | Kitou | H01R 13/72 439/501 |
| 2005/0059441 A1 * | 3/2005 | Miyashita | G06F 1/1615 455/575.1 |
| 2005/0077870 A1 | 4/2005 | Ha | |
| 2007/0096685 A1 * | 5/2007 | Skogmar | H02J 7/00 320/107 |
| 2007/0182368 A1 | 8/2007 | Yang | |
| 2007/0222414 A1 | 9/2007 | Chen | |
| 2007/0279072 A1 | 12/2007 | Fagrenius et al. | |
| 2009/0149050 A1 * | 6/2009 | Lyu | H01R 27/00 439/310 |
| 2009/0160640 A1 | 6/2009 | Leung et al. | |
| 2009/0314515 A1 * | 12/2009 | Bevirt | H01B 7/40 174/110 R |
| 2010/0159741 A1 | 6/2010 | Philip | |
| 2011/0008980 A1 * | 1/2011 | Obata | G11B 33/025 439/131 |
| 2011/0164374 A1 * | 7/2011 | Tai | H01R 13/72 361/679.33 |
| 2011/0170249 A1 * | 7/2011 | Nunes | G01D 9/005 361/679.01 |
| 2011/0300906 A1 * | 12/2011 | Colgan | H02J 7/0045 455/558 |
| 2012/0121120 A1 * | 5/2012 | Gorzelany | H02G 3/04 381/384 |
| 2012/0170192 A1 * | 7/2012 | Chang | G06F 1/1684 361/679.02 |
| 2012/0235914 A1 * | 9/2012 | Hsu | G06F 3/0227 345/167 |
| 2012/0275118 A1 * | 11/2012 | Vandiver | G06F 1/1632 361/728 |
| 2013/0048341 A1 | 2/2013 | Wayne et al. | |
| 2013/0114231 A1 * | 5/2013 | Cheng | G06F 1/1633 361/807 |
| 2013/0305495 A1 | 11/2013 | Bruce | |
| 2014/0010400 A1 | 1/2014 | Morris | |
| 2014/0042969 A1 * | 2/2014 | Miller | H02J 7/0042 320/111 |
| 2014/0091888 A1 | 4/2014 | Gibbs et al. | |
| 2014/0332264 A1 | 11/2014 | Chen et al. | |

FOREIGN PATENT DOCUMENTS

| | | |
|---|---|---|
| CN | 201194426 Y | 2/2009 |
| CN | 201260006 Y | 6/2009 |
| CN | 202550249 U | 11/2012 |
| CN | 202917737 U | 5/2013 |
| CN | 202917764 U | 5/2013 |
| CN | 202940950 U | 5/2013 |
| CN | 203086544 U | 7/2013 |
| CN | 203456692 U | 2/2014 |
| DE | 4008657 A | 9/1991 |
| DE | 202006006271 U1 | 4/2006 |
| DE | 202006006274 U1 | 4/2006 |
| EP | 1 536 615 A1 | 6/2005 |
| EP | 1536615 A1 | 6/2005 |
| EP | 1814014 A1 | 8/2007 |
| EP | 2037347 A1 | 3/2009 |
| EP | 2 299 661 A2 | 3/2011 |
| EP | 2299661 A2 | 3/2011 |
| GB | 2330925 A | 5/1999 |
| GB | 2413441 A | 10/2005 |
| JP | 2001109545 A | 4/2001 |
| JP | 2002354078 A | 12/2002 |
| JP | 2004072498 A | 3/2004 |
| JP | 2006254228 A | 9/2006 |
| KR | 100970464 B | 7/2010 |
| KR | 20140050381 A | 4/2014 |
| NL | 1030696 C2 | 6/2007 |
| WO | WO 88/05573 | 7/1988 |
| WO | WO 2010/033793 | 7/2010 |

\* cited by examiner

POWER ADAPTER UNIT WITH INTEGRATED INPUT/OUTPUT INTERFACE, AND PORTABLE ELECTRONIC DEVICE WITH STORAGE RECESS FOR MULTIFUNCTION POWER ADAPTER

CROSS-REFERENCE TO RELATED APPLICATIONS

This application is a U.S. National Stage Application under 35 U.S.C. § 371 of International Patent Application No. PCT/GB2014/052968, filed Oct. 1, 2014 which claims priority to Great Britain Patent Application No. 1314624.3, filed Oct. 4, 2013, which are hereby incorporated by reference in their respective entireties.

TECHNICAL FIELD

The invention relates to devices (e.g. power adapters, data ports and data plugs, audio ports and audio jacks, etc.) which provide a connection between portable electronic devices (e.g. smartphone, MP3 player, etc.) and associated peripheral devices (e.g. earphones, USB ports, etc.) and/or external power supplies.

BACKGROUND TO THE INVENTION

Portable electronic devices providing a plurality of functions such as telephone and internet connectivity, music and video playback are well known. Such devices usually require a power adapter for recharging a battery from a mains power supply or via a USB connection and a set of earphones for a user to listen to an audio output signal. When travelling for extended periods, it is often necessary to transport the power adapter and the set of earphones in addition to the portable electronic device itself. In some cases the power adapter and earphones can take up more space than the portable electronic device itself.

Space saving designs for power adapters, earphones and the like to increase their portability are already known. For example, WO 2006/016119 discloses a design for a 3-pin plug with foldable pins and CN 2396594 discloses a telephone handset with a inbuilt cavity for storing earphones and associated wiring. Devices with retractable USB plugs are also known.

SUMMARY OF THE INVENTION

At its most general, the present invention provides a multifunctional adapter or interface unit for a portable electronic device, the adapter unit being stored or stowable within the portable electronic device and preferably being capable of providing a plurality of different connection functions for the portable electronic device depending on its physical configuration.

According to a first aspect of the invention, there is provided a portable electronic device comprising a main body, and a multifunction interface unit communicably connectable to the main body via a cable, wherein the main body includes a recess for storing the interface unit, and wherein the multifunction interface unit is selectively operable as a power adapter and a user input/output device.

Herein the term "power adapter" may mean a unit for transferring and, optionally, transforming power from an external power source (e.g. mains power) to the portable electronic device, e.g. for purpose of recharging a battery. For example, the power adapter may be an AC/DC adapter, having a transformer or rectifier integrated therewith. Alternatively or additionally, the power adapter may function to transfer power from an external supply (either DC or AC) into a portable electronic device, with or without transforming that power. For example, the power adapter may function to connect the portable electronic device to a laptop or desktop computer, from which a DC power signal is available.

The term "user input/output device" may mean a unit that operate to transfer and, optionally, transform signals to and/or from the portable electronic device for use by a user. For example, the user input/output device may be a pair of earphones, which act to transfer an audio signal to a user. Alternatively, the user input/output device may comprise a USB adapter plug and cable for conveying data into or out of the portable electronic device. In principle the user input/output device may be any unit suitable for transferring audio, video or data traffic between a user (or other external device) and the portable electronic device.

The main body is the housing of the portable electronic device which contains the functional components thereof, e.g. processor, memory, display, etc. Incorporating a multifunction interface unit into the main body provides a complete self-contained portable entity, i.e. it is not necessary for the user to remember to carry additional components in order to use all of the functions of the device.

The device may include a mode selector arranged to configure the circuitry of the device according to a selected function of the multifunction interface unit. The mode selector may be mounted on or part of the main body. The mode selector may communicate, electronically and/or physically, with the multifunction interface unit. The plurality of selectable functions may permit the portable electronic device to interface or interact with other entities. For example, the multifunction interface unit may enable the portable electronic device to connect to an external power supply (e.g. mains power) or to other computing devices (via a USB connection or the like). Furthermore, the multifunction interface unit may provide additional peripheral user input/output means, such as audio (e.g. via earphones), or a computer mouse or the like. According to the invention, the interface to these additional functions can be inbuilt, i.e. stowable in the device when not need. Moreover, the device can be easily configurable to adapt to the selected function.

The portable electronic device may be a laptop computer, tablet computer, smartphone, MP3 player, cell phone, or any other portable electronic device. The main body may be a conventional handset or casing, save for the recess to house the multifunction interface unit and the mode selector.

The mode selector may be a physical switch or dial operable by the user. Alternatively, the mode selector may operate automatically, e.g. via software instructions running in the portable electronic device, based on a detected configuration of the multifunction interface unit.

The main body may include a battery. As mentioned above, the multifunction unit may be operable as a power adapter, whereby it performs a battery recharge function.

In order to execute the battery recharge function, the multifunction interface unit may include a power adapter plug portion that is receivable in a mains power socket. For example, the power adapter plug portion may include a body having a pair of terminal pins protruding therefrom, wherein the pair of terminal pins are shaped and spaced to be receivable in a mains power socket (e.g. a two-pin or three-pin mains power socket). The power adapter plug portion may be connected to the device via a cable containing wiring suitable for conveying a power signal for recharging the battery. The power adapter plug portion may include a transformer for converting an AC mains signal into a DC power signal. The mode selector may be arranged to configure the circuitry of the device to pass the power signal from the power adapter plug portion to the battery.

If the multifunction interface unit operates as a user input/output device, it may execute a peripheral communication function, i.e. it may control or facilitate communication between the portable electronic device and an external peripheral device. Herein the term "peripheral device" may have its conventional meaning, i.e. any device that is used to send or receive information from a computing device. According to the invention, the multifunction interface unit may comprise one or more peripheral devices. For example, the multifunction interface unit may comprise a pair of earphones or a USB plug adapter. Each peripheral device may be communicably connectable, e.g. via a cable and suitable adapter plug (e.g. USB adapter or jack), to the power adapter plug portion when the power adapter plug portion is stowed in the recess of the portable electronic device.

The multifunction interface unit may include a peripheral storage portion in which the peripheral device is stowable when not in use. The peripheral storage portion may be part of the power adapter plug portion. For example, the body of the power adapter plug portion may have a retractable tray slidably or pivotably mounted therein. The tray may be arranged to receive one or more peripheral components, such as a pair of earphones. The peripheral component may be communicably connected to the handset wirelessly (e.g. using the Bluetooth® protocol) or via a cable.

Alternatively or additionally, the peripheral storage portion may be separate or separable from the multifunction interface unit. For example, the peripheral storage portion may include a data transfer component for inserting into a data communication port on another computing device to enable data communication between the portable electronic device and the other computing device. The data transfer component may be or may capable of insertion into a port on another computing device. For example, the data transfer component may be a USB plug (e.g. a USB type A connector).

The multifunction interface unit may comprise a power adapter plug body (e.g. containing a peripheral device storage portion as discussed above), a data transfer connector, e.g. USB plug, and a cable connected between the power adapter plug body and data transfer connector. The recess in the main body of the portable electronic device may be arranged to receive all of the power adaptor plug body, cable and data transfer component. Preferably, the recess includes terminal connectors arranged so that the plug adaptor body and the data transfer connector and operably connected to the portable electronic device when the multifunction interface unit is stowed in the recess. In this way, the device may automatically select the relevant function for the multifunction interface unit depending on which connections in the recess are detected to be present. Thus, if the data transfer connector is detached but the power adapter plug remains connected, the multifunction interface unit operates as a data transfer unit. If the data transfer component is connected and the power adapter unit detached, the multifunction interface unit operates as a power adapter. In this arrangement, the capable thus has a dual functionality, depending on the operation mode of the multifunction interface unit.

If the power adapter plug body includes a peripheral device storage portion, e.g. retractable tray, this is preferably accessible while the power adapter plug body is secured in the recess. The peripheral device may thus be accessed independently of the power adapter plug. Again, the portable electronic device may detect the configuration in which the peripheral device is detached but the power adapter plug and data transfer connector remain connected. In this configuration, the multifunction interface unit thus operates as a user input/output device.

The multifunction interface unit may include a controller portion for sending user instructions to the main body of the portable electronic device (sometimes referred to herein as the handset). For example, the controller portion may include volume control push buttons and/or a locking switch. The controller portion may be located on an outer side of the handset when the multifunction interface unit is stowed therein so that the controller portion are accessible in use. The peripheral storage portion may be part of the controller portion. For example, the controller portion may include a retractable tray as mentioned above. In one embodiment, the controller portion may comprise a retractable data transfer component, e.g. a retractable plug, such as a USB plug or the like.

The controller portion may be separate from the power adapter plug portion. The controller portion may be connected to the handset by a first length of cable, and the power adapter plug portion (and its associated peripheral component) may be connected to the controller portion by a second length of cable. The cable may be configured to carry the necessary signals to or from a handset depending on the selected mode of operation.

The main body may include a recessed channel around its side surfaces to store the cable. The cable may comprise a flat sheath that encapsulates the wiring, wherein the flat sheath is shaped to fit snugly in the recessed channel. This may facilitate alignment of the cable in the channel and can improve the appearance of the main body (e.g. mobile phone handset). In one embodiment, the cable may be magnetically retainable in the recessed channel, e.g. using one or more magnets in the main body, which attract corresponding magnets mounted in the cable itself.

Alternatively, the cable may comprise a plurality of rigid portions that are retainable in a folded stack configuration for storage in a corresponding recess in the portable electronic device.

The cable itself may include a split portion comprising a pair of separable cable strands, e.g. for delivering audio signals to a respective earphone. The pair of separable cable strands may be connected together so that the split portion resembles a single cable. The connection may be physical, but preferably the pair of separable cable strands are arranged to be magnetically attracted together.

The power adapter plug portion itself may be an independent aspect of the invention. According to this aspect, there may be provided a power adapter unit for a portable electronic device, the power adapter unit comprising: a plug body having a plurality of terminal pins shaped as spaced to be receivable in a mains power socket; a cable connected to the plug body for conveying an electrical signal received through the plurality of terminal pins; a user input/output device; and a retractable storage tray in the plug body for holding the user input/output device. The user input/output device may be a peripheral device as described above, e.g. a pair of earphones or the like. The retractable tray may include a recess shaped to receive the earphones. The pair earphones may be separable from the plug body, when in use.

The cable connected to the plug body may also be connected to the user input/output device. For example, the cable may comprises a pair of cable strands, each cable strand being of a respective one of the pair of earphones. The cable may thus be arranged to convey a power signal from the plurality of terminal pins when the user input/output device is stored in the storage tray, and to convey a communication signal to the user input/output device when the user input/output device is removed from the storage tray. For example, the cable may convey an audio signal to the earphones. To achieve this, the storage tray may include one or more electric terminals that physically contact and electrically connect to corresponding electric connections on the user input/output device when mounted in the storage tray. The recess in the storage tray may be arranged to ensure safe and repeatable contact. For example, when the user input/output device is a pair of earphones, the one or more electric terminals may be provided on a collar in the recess that receives the neck of the earphone. An electric connection may thus be provided on the neck of the earphone to convey the power signal to the cable. The electric connection on the neck of the earphone may be isolated or shielded from the audio components in the earphone. Alternatively, the electric connection may be switched based on the output from a control device, e.g. a microchip mounted in the earphones that is controllable via the main body.

The connector portion discussed above may also be understood as an independent concept presented herein. According to this concept, there may be provided a peripheral cable interface for a portable electronic device, the peripheral cable interface comprising a body connectable between a peripheral component and the portable electronic device by a first cable and a second cable respectively, the body including a first body portion having a first cable port for receiving the first cable and a second body portion having a second cable port for receiving the second cable, wherein the first body portion and second body portion are rotatable relative to each one between a storage configuration in which the first cable port and second cable port are at the same end of the body and a use configuration in which the first cable port and second cable port are at different ends of the body. The peripheral cable interface may be mountable in a recess in the portable electronic device when in the storage configuration.

The peripheral cable interface may include a user interface arranged to communicate user instructions to the portable electronic device. The user interface may be used to control audio volume, etc.

The peripheral cable interface may include a data transfer component (e.g. USB connector) for inserting into a USB port on another computing device to enable data communication between the portable electronic device and the other computing device.

BRIEF DESCRIPTION OF THE DRAWINGS

Embodiments of the invention are described in detail below with reference to the accompanying drawings, in which.

DETAILED DESCRIPTION; FURTHER OPTIONS AND PREFERENCES

Figure 1A:
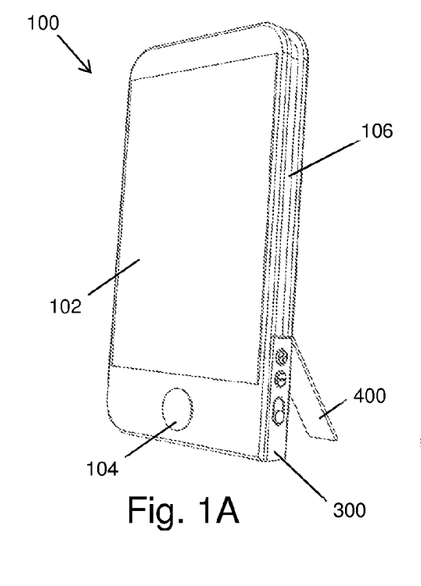
FIG. 1A is a front perspective view of a smartphone that incorporates a multifunction interface unit that is an embodiment of the invention.

FIG. 1A shows a smartphone 100 having a multifunction interface unit that is an embodiment of the invention. Although the invention is illustrated herein with reference to a smartphone, it can be appreciated that it is applicable to any consumer electronic device, especially portable electronic devices such as laptop computers, tablet computers, etc.

The smartphone 100 may be operable in a conventional manner, e.g. by a touch screen 102 and button 104. The multifunction interface unit is housed within the smartphone body. As described below, in this embodiment the multifunction interface unit has two parts. The first part is a power adapter plug portion 200 (shown in FIGS. 2A to 2C) and the second part is a controller portion 300. The smartphone 100 is connected to the controller portion 300 by a first length of cable (not shown in FIGS. 1A and 1B). The controller portion 300 is connected to the power adapter plug portion 200 by a second length of cable (also not shown). The body of the smartphone 100 includes a recessed channel 106 around its sides for receiving the first and second lengths of cable. The cable is connected, either permanently or removably, to the smartphone 100 at the end of the recessed channel 106.

Figure 1B:
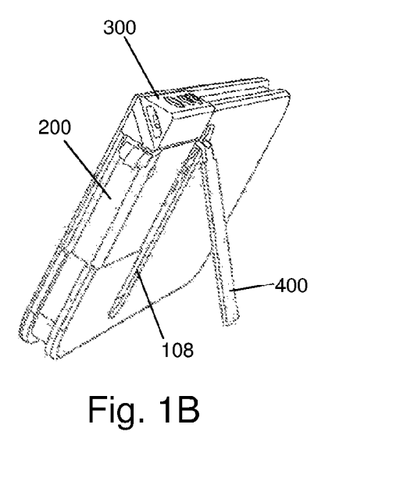
FIG. 1B is a rear perspective view of the smartphone shown in FIG. 1A.

In a preferred embodiment, the first and second lengths of cable comprises a flat sheath made of a suitable flexible material (e.g. silicone rubber) in which the conductive wire elements are embedded. The cable may be retained in the channel 106. In a preferred embodiment, the cable may be retained in the channel 106 using magnets, which facilitate alignment.

As shown in FIG. 1B, the multifunction interface unit is mounted along the bottom side of the smartphone 100. The controller portion 300 is mounted at the edge of the smartphone so that is presents an outer surface at the edge of the smartphone. This outer surface may have control buttons, e.g. for volume, or a phone lock switch, which operate in a conventional manner.

The smartphone 100 includes a stand 400 that pivots out of a recess 108 in the back surface of the body of the smartphone 100. The stand 400 also functions as the handle of a rotatable selector dial discussed below with reference to FIGS. 3A to 3C.

Figure 2A:
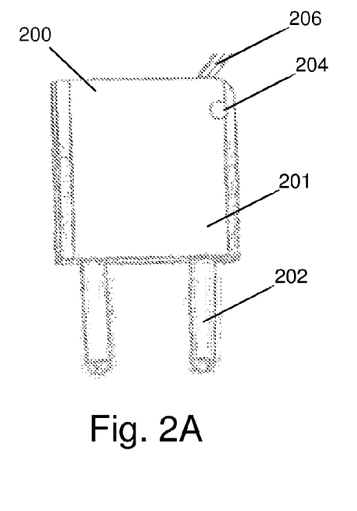
FIG. 2A shows a power adapter plug portion of the multifunction interface unit when removed from the smartphone of FIG. 1A.
Figure 3A:
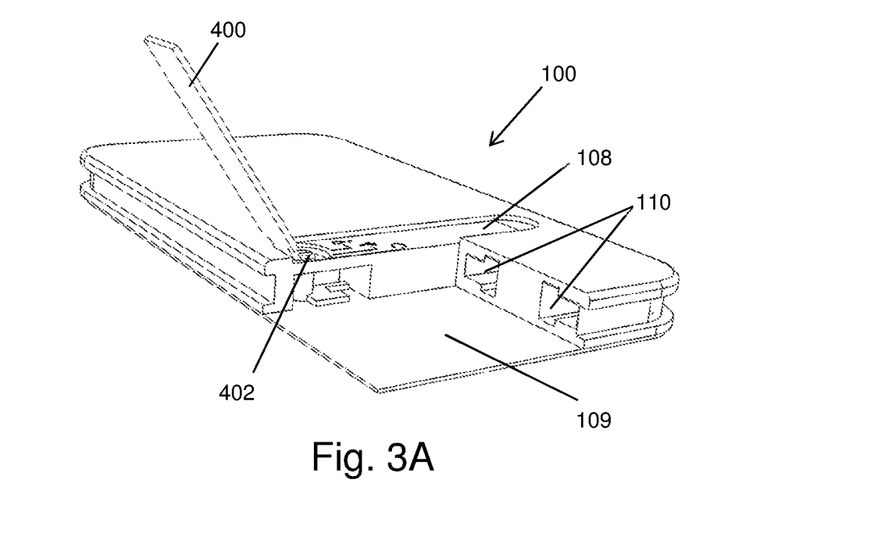
FIG. 3A shows a rear perspective view of the smartphone with the power adapter plug portion removed.

FIG. 2A illustrates the power adapter plug portion 200 after it is removed from the body of the smartphone 100. The power adapter plug portion 200 comprises a body 201 having two pins 202 projecting from one end thereof. The pins 202 may be shaped and spaced in a manner to fit a conventional two-pin plug socket. As shown in FIG. 3A, the body of the smartphone includes a pair of slots 110 for receiving the pins 202 when the power adapter plug portion 200 is stored therein.

Figure 2B:
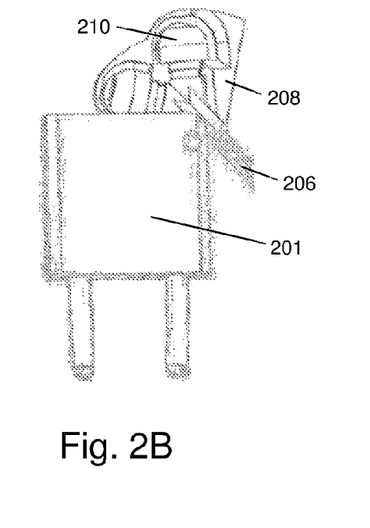
FIG. 2B shows the power adapter plug portion of FIG. 2A with a peripheral storage tray pivoted outward therefrom.
Figure 2C:
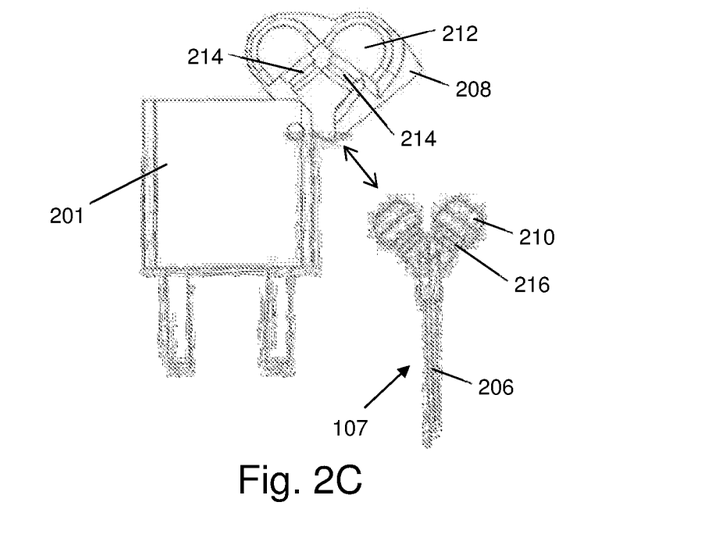
FIG. 2C shows the power adapter plug portion of FIG. 2B with a pair of earphones removed from the peripheral storage tray.

The body 201 of the power adapter plug portion 200 stores the necessary circuitry to transmit a power signal from the pins 202 to the cable 206. In this embodiment, the body 201 also houses a peripheral storage tray 208, which is pivotable in and out of the body 201 on a hinge 204. FIG. 2B shows the peripheral storage tray 208 partly rotated out of the body 201. In this embodiment, a pair of earphones 210 are stored in the peripheral storage tray 208. FIG. 2C shows the peripheral storage tray 208 fully rotated out of the body 201 and the earphones 210 removed. The peripheral storage tray 208 includes a recessed pocket 212 for receiving the earphones 210.

The cable 206 comprises two separate strands. Each strand is attached to a respective earphone 210. One or both cable strands are capable of transmitting the power signal from the power adapter plug portion 200 to the smartphone and conveying an audio signal from the smartphone to the earphones 210. The function performed by the cable 206 may depend of the position of the rotatable selector dial, as discussed below. To make electrical contact between the pins 202 and the wiring in the cable 206, the recessed pocket 212 in the peripheral storage tray 208 may include an electric terminal 214 at a position where it contacts a corresponding terminal 216 on the collar of one or both earphones 210. The circuitry may be arranged to shield or isolate the earphones 210 from the power signal. Each cable may carry four or more separate conductive wires. Each wire can be used to carry a power signal, data signal or an audio signal. The signals can be shared across the wires, or a cable may carry two signals, e.g. an audio signal and a control signal on different pairs of wires in the cable.

Figure 3B:
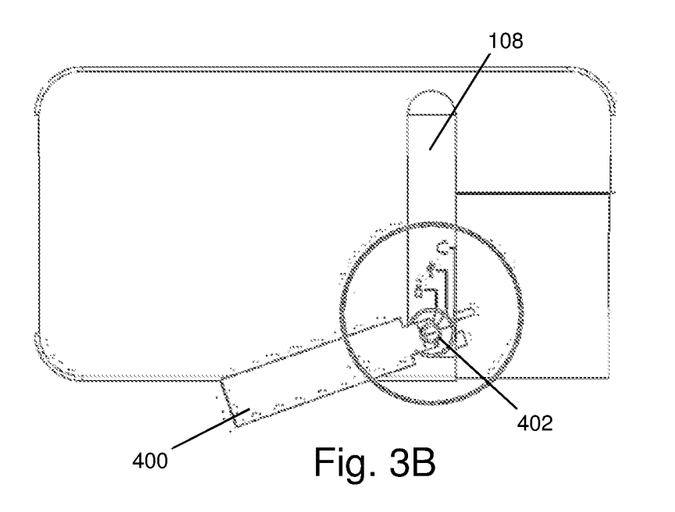
FIG. 3B shows a rotatable selector dial on the back of the smartphone of FIG. 3A.
Figure 3C:
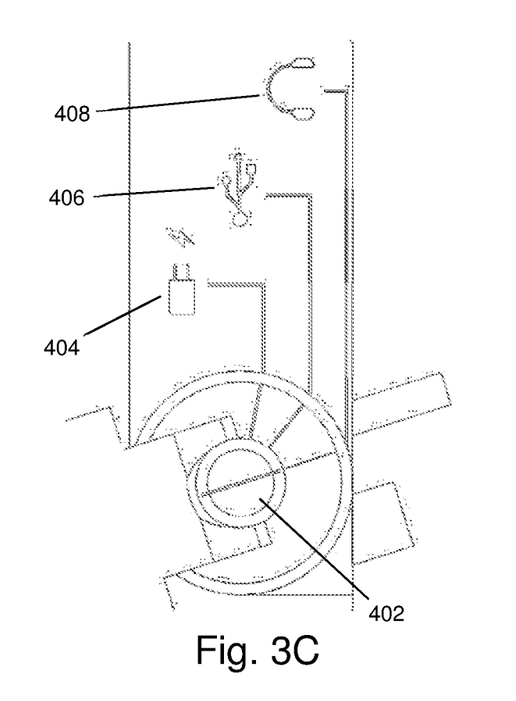
FIG. 3C shows a close-up view of the rotatable selector dial.

FIGS. 3A to 3C illustrate the configuration and function of the rotatable selector dial 402, which is operated using the handle 400. The handle 400 is pivotable about the rotatable selector dial 402 between a protruding position (as shown in FIGS. 3A to 3C) and a stored position, in which it is seated in recess 108. The position of the rotatable selector dial 402 sets the internal circuitry of the smartphone 100 to ensure that it is correctly configured to send and/or receive an appropriate signal along the cable from the multifunction interface unit.

The circled section in FIG. 3B is shown in close up in FIG. 3C. In this embodiment, the rotatable selector dial 402 is movable between three positions, which represent respective functions of the multifunction interface unit. The first function 404 is for charging the battery of the smartphone. Here the internal circuitry of the smartphone is configured to convey a power signal received from the power adapter plug portion to recharge the battery. The second function 406 is for USB functionality. Here the internal circuitry of the smartphone is configured to send and receive data communication signals from a USB plug on the controller portion 300 (discussed below). The third function 408 is for earphone operation. Here the internal circuitry of the smartphone is configured to send an audio signal to the earphones 210.

The rotatable selector dial 402 may include one or more actuating protrusions which interface with the body 201 in different ways depending on the position of the dial. For example, when the rotatable selector dial 402 selects third function 408, an actuating protrusion may extend into the body 201 to release the tray 208 without disturbing the position of the body 201 in the smartphone 100. For the first and second functions, the rotatable selector dial 402 may include actuating protrusions which act to push or lever the body 201 or controller portion 300 out of the recess in the smartphone 100. The handle 400 may be further pivotable when in these positions to cause the actuating protrusions to extend further into the recess. There may be a restrictive collar around the rotatable selector dial 402 which inhibits further such pivoting of the handle 200 unless it is properly aligned in the position of the relevant function.

Figure 4A:
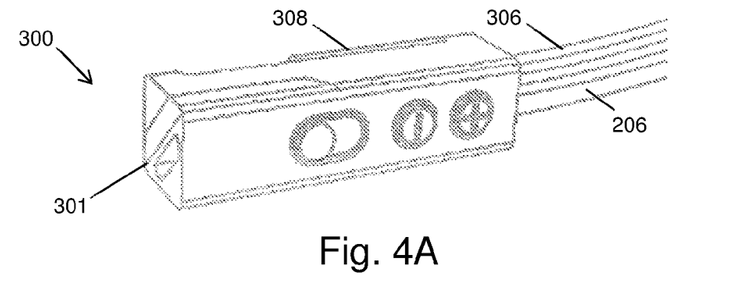
FIG. 4A shows a controller portion of the multifunction interface unit in a storage configuration when removed from the smartphone of FIG. 1A.

FIGS. 4A to 4D shows the controller portion 300 of the multifunction interface unit after it has be removed from the smartphone 100. FIG. 4A shows the controller portion 300 in a storage configuration, in which it can be stowed in the smartphone 100. In this configuration, the controller portion 300 receives two lengths of cable 206, 306 into the same end thereof. The first length of cable 306 connected the controller portion 300 to the smartphone. The second length of cable 206 connects the controller portion 300 to the power adapter plug portion 200.

Figure 4B:
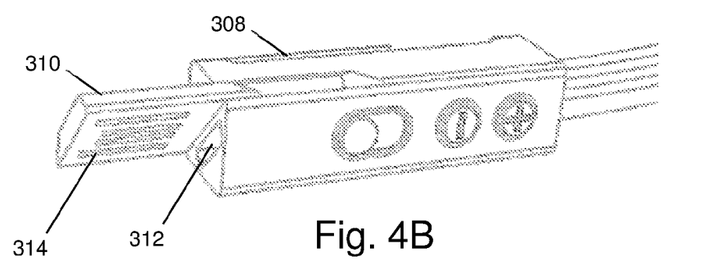
FIG. 4B shows the controller portion of FIG. 4A in a data transfer plug deployed configuration.
Figure 4C:
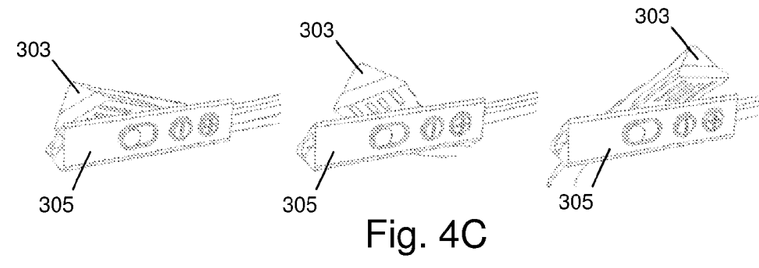
FIG. 4C shows a transition of the controller portion of FIG. 4A from the storage configuration towards an earphone deployed configuration.
Figure 4D:
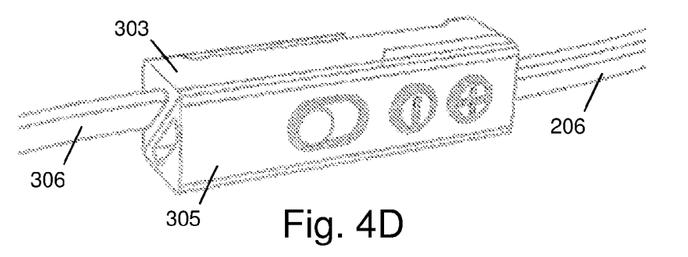
FIG. 4D shows the controller portion of FIG. 4A in the earphone/power adapter plug deployed configuration.

The controller portion 300 itself comprises a cuboidal body 301 made from two triangular prisms 303, 305 which can be twisted relative to one another about a central pivot point as shown in FIG. 4C. The first length of cable 306 connects to a first triangular prism 303, and the second length of cable 206 connects to a second triangular prism 305. Twisting the two triangular prisms 303, 305 about 180° relative to each other therefore causes the lengths of cable 206, 306 to extend from opposite ends of the controller portion 300 as shown in FIG. 4D. In this configuration, the controller portion 300 can be used as a quasi-remote volume control on a cable that extends from the smartphone 100 to the earphones 210.

The controller portion 300 includes a slider 308 on the first triangular prism 303. The slider 308 is operable to extend and retract a data transfer plug 310 from the body 301. FIG. 4B shows the data transfer plug 310 in an extended position ready for use. The data transfer plug may be capable of insertion into a USB port.

The second triangular prism 305 includes a data transfer port 312, e.g. a USB port. When the slider 308 is retracted, electrical contacts 314 on the bottom surface of the data transfer plug 310 align with and electrically connect to corresponding contact on the second triangular prism 305, whereby data communication signals received in the data transfer port 312 can be conveyed to the smartphone using the same circuitry as the data transfer plug 310.

Figure 5:
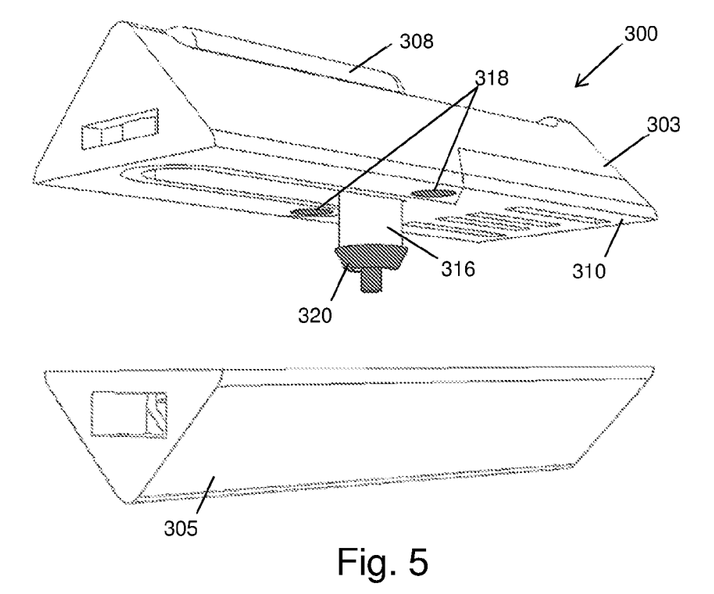
FIG. 5 shows the relatively rotatable components of the controller portion of FIG. 4A.

FIG. 5 shows a view of the controller portion 300 in which the first and second triangular prisms 303, 305 are separated. The first triangular prism 303 includes a projecting post 316 which is received in a corresponding recess in second triangular prism 305. The first and second triangular prisms 303, 305 are relatively rotatable about the post 316.

Electrical connection between the first and second triangular prisms 303, 305 is achieved using a pair of electrical terminals 318 on the first triangular prism 303, which overlie and electrically connect to corresponding electrical terminals on the second triangular prism 305, and a male coaxial connector 320 on the first triangular prism 303, which is rotatably mounted in a corresponding female connector (not shown) on the second triangular prism 305. The coaxial connector forms a permanent electrical connection through the controller portion 300, whereas the electrical terminals 318 form a connection only when the triangular prisms are aligned.

Figure 6:
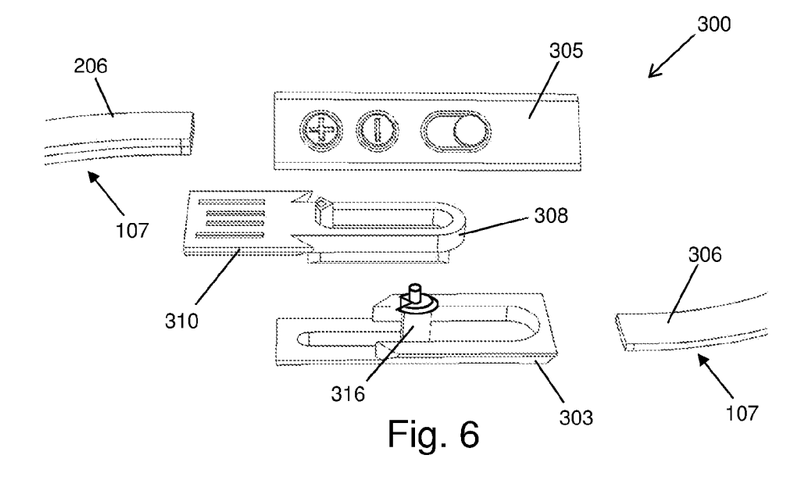
FIG. 6 shows an exploded view of the controller portion of FIG. 4A.

FIG. 6 shows an exploded view of the connector portion 300, which illustrates how the data transfer plug 310 can be formed in one piece with the slider 308 to move relative to the first and second triangular prisms 303, 305.

Figure 7A:
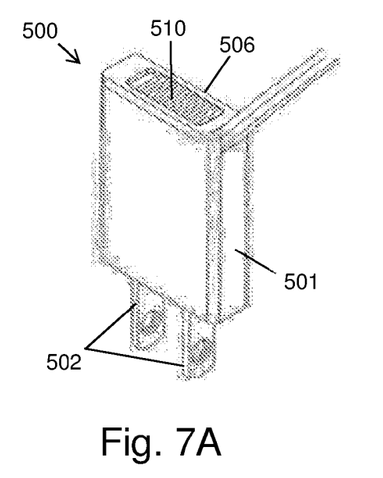
FIG. 7A shows a multifunction power adapter plug that is another embodiment of the invention.
Figure 7B:
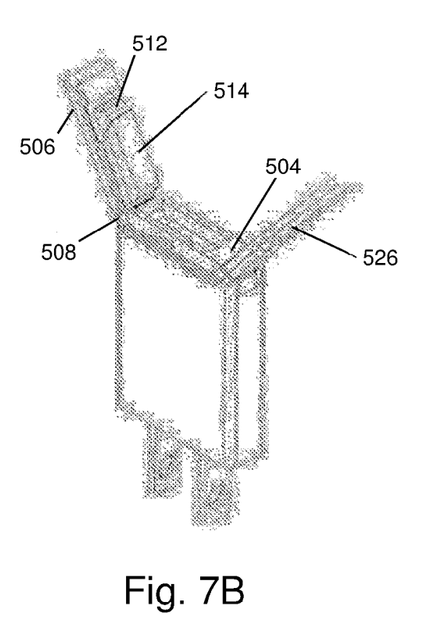
FIG. 7B shows the multifunction power adapter plug of FIG. 7A with its hinged cover in an open position.
Figure 7C:
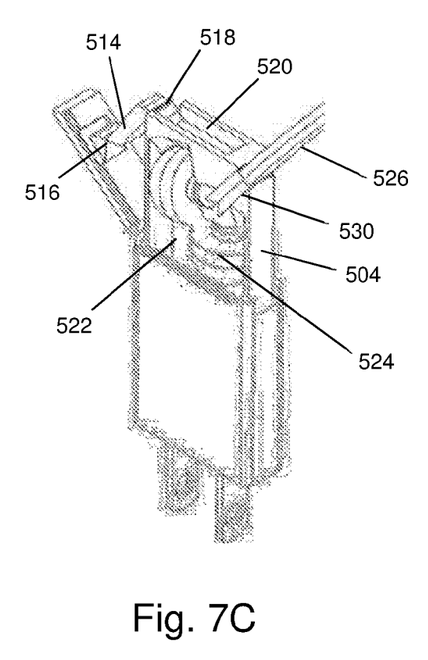
FIG. 7C shows the multifunction power adapter plug of FIG. 7A with a slidable peripheral storage tray partially extracted therefrom.

FIGS. 7A, 7B and 7C show a multifunction plug adapter 500 that is another embodiment of the invention. The plug adaptor 500 comprises a cuboidal body 501 having a pair of terminal pins 502 projecting from a front edge thereof. The body 501 is hollow, and has a slidable tray 504 mounted therein (see FIG. 7C). The rear edge of the body 501 comprises a cover 506 that is connected to a corner of the housing at a living hinge 508 which permits the cover 506 to pivot between a closed position (shown in FIG. 7A) and an open position (shown in FIG. 7B).

The cover 506 has a slidable button 510 on its outer surface which operates a catch 512 on the inside surface thereof. The catch 512 cooperates with a recess of the slidable tray to secure the cover 506 to the tray when in the closed position. The catch 512 may be biased into engagement with the recess.

As shown in FIGS. 7B and 7C, the slidable tray 504 is connected to the underside of the cover 506 by an arm 514. A first end of the arm 514 is pivotably attached to the underside of the cover 506 at a first living hinge 516, and a second end of the arm 514 opposite to the first end is pivotably attached to the slidable tray 504 at a second living hinge 518. In operation, the arm 514 permits a limited sliding range for the tray 504, whereby the tray is prevent from leaving the body 501. There is a recess 520 in the top surface of the slidable tray 504 shaped to receive the arm 514 when the cover 506 is in the closed position.

Similarly to the arrangement discussed with reference to FIGS. 2A, 2B and 2C above, the slidable tray 504 includes a shaped pocket 522 for receiving a pair of earphones 524. A cable 526 (e.g. a pair of cables magnetically retained together as discussed above) for the earphones extend through an opening formed by gaps in the corners of the slidable tray 504 and body 501 respectively.

The other end of the cable 526 is connected or connectable to a portable electronic device (e.g. smartphone, tablet, laptop, MP3 player, etc.). The cable 526 may terminate at a USB plug. The cable is capable of performing two functions: (i) audio data signal delivery to the earphones (e.g. from the portable electronic device), and (ii) power (recharging) signal delivery from the power adapter plug (e.g. to the portable electronic device). The slidable tray 504 may include a collar 530 at the gap in its corner for engaging the cable 526, e.g. in an interference fit. The collar 530 may have power connector portions (e.g. operating inductively or conductively) for transferring power into the cable 526.

Figures 8A, 8B:
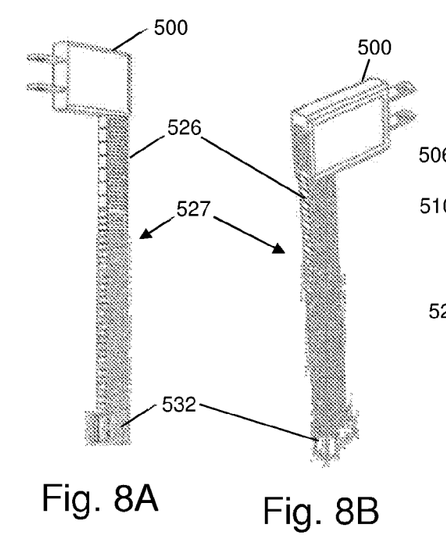
FIGS. 8A and 8B show left and right side views respectively of a multifunction power adapter plug that is another embodiment of the invention.
Figure 8C:
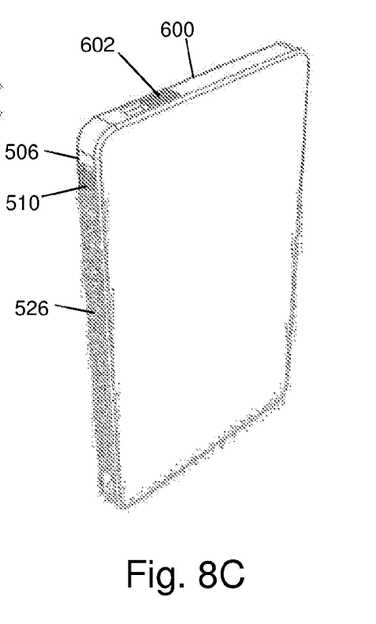
FIG. 8C is a perspective view of a smartphone having the multifunction power adapter plug of FIGS. 8A and 8B mounted in a side edge recess thereof.

The multifunction plug adapter 500 shown in FIGS. 7A, 7B and 7C may be mountable in a recess formed in the side edge surface of a portable electronic device (e.g. smartphone 600) as shown in FIGS. 8A, 8B and 8C. The cable 526 may be arranged to adopt a folded stack configuration. The folded stack configuration may be formed from a plurality of rigid cable sub-portions, which retained one on top of another e.g. used magnets or the like. Each rigid cable sub-portions is separated from its nearest neighbour by a flexible joint, whereby the cable forms a repeating "S" pattern up the folded stack.

A USB plug 532 is attached at the end of the cable opposite to the body 501.

The smartphone 600 may include a recess (not shown) similar to that discussed above with reference to FIG. 3A for receiving the body 501 of the plug adapter 500. The body 501 may be retained in the recess by means of a mechanical catch, which is releasable by operation of slider 602.

The smartphone 600 may further include a narrow recessed channel shaped to receive the cable 526 in the folded stack configuration. The recessed channel may have a depth selected to ensure that the cable formed part of the side edge of the smartphone when stored therein. This configuration also means that the cover 506 of the body is directly accessible on the side edge of the smartphone 600. The button 510 on the cover can thus be operated independently of the slider 502, whereby the earphones can be extracted without removing the body 501 from the smartphone.

The recessed channel may have a USB port at its base for receiving the USB plug 532. Thus, when the multifunction plug adapter is stored in the smartphone 600, the USB plug 532 is operatively connected to the smartphone 600. This configuration enables the multifunction plug adaptor to be ready for use with either the earphones of the power adapter. If the earphones are extracted from the body, the USB port acts as an output unit, whereby audio signals are sent from the smartphone through the USB plug. Alternatively, if the power plug adapter is extracted, the USB port acts as an input unit, for deliver a power (recharge) signal into the smartphone. In a further development, the USB plug 532 may be detached from the smartphone 600 while the plug adapter body 501 and earphones are stowed. In this arrangement the multifunction unit may operate as a data transfer unit, to permit the smartphone to be connected to another computing device, whereby data signals can be sent through the cable into and out of the smartphone. In this arrangement, the recess for receiving the plug adapter body 501 may be provided with suitable electrical connections to enable data signals to be transferred to and from the cable 526.

Figure 9:
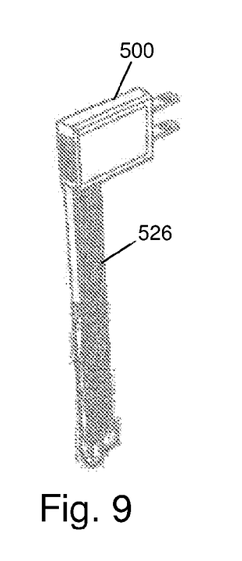
FIG. 9 is a right side view of a multifunction power adapter plug that is another embodiment of the invention.

FIG. 9 shows the multifunction plug adapter 500 of FIGS. 7A, 7B and 7C with an alternative folded stack configuration for the cable 526. In this arrangement, the rigid cable sub-portions are arranged vertically rather than horizontally. This allows them to be longer, which may improve the speed with which the cable can be stored.

Figure 10A:
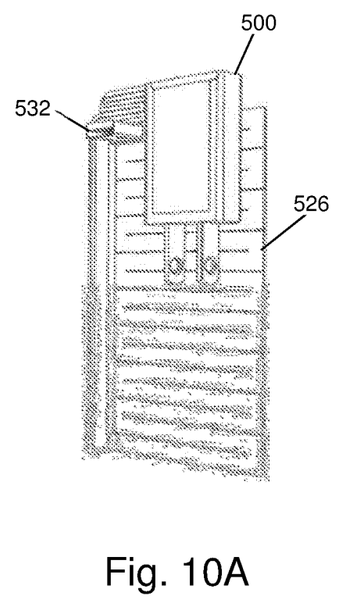
FIG. 10A is a perspective view of a multifunction power adapter plug that is another embodiment of the invention.
Figure 10B:
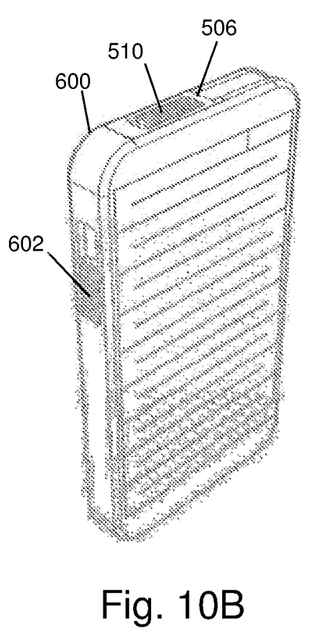
FIG. 10B is a perspective view of a smartphone having the multifunction power adapter plug of FIG. 10A mounted in a back surface recess thereof.

FIGS. 10A and 10B shows the multifunction plug adapter 500 of FIGS. 7A, 7B and 7C with yet another cable storage configuration. In this embodiment, the body 501 of the plug adapter is receivable in a recess formed in the top edge surface of the smartphone 600. The cover 506 and button 510 are directly accessible as explained above. The slider 602 for releasing the plug adapter body 501 is located on the side edge of the smartphone 600.

The cable 526 in this embodiment is stored in a planar configuration which can lie against (and be secured, e.g. magnetically, to) the rear surface of the smartphone 600.

Aspects of the disclosure presented herein may be summarised by the following statements:

A portable electronic device comprising: a main body, and a multifunction interface unit communicably connected to the main body via a cable, the multifunction interface unit providing a plurality of selectable functions, wherein the main body includes a recess for storing the interface unit.

A portable electronic device as described above including a mode selector arranged to configure the circuitry of the device according to a selected function of the multifunction interface unit.

A portable electronic device as described above, wherein the mode selector is a physical switch or dial.

A portable electronic device as described above, wherein the main body houses: a user input/output interface; a processor; a memory; software instructions stored on the memory and executable by the processor, wherein the software instructions include instructions for configuring operation of the portable electronic device according to a setting of the mode selector.

A portable electronic device as described above, wherein the main body includes a battery, and the plurality of selectable functions includes a battery recharge function and a peripheral communication function.

A portable electronic device as described above, wherein the multifunction interface unit includes a power adapter plug portion that is receivable in a mains power socket.

A portable electronic device as described above, wherein the power adapter plug portion includes a body having a plurality of terminal pins protruding therefrom, wherein the plurality of terminal pins are shaped and spaced to be receivable in a mains power socket.

A portable electronic device as described above, wherein the power adapter plug portion includes a peripheral storage portion.

A portable electronic device as described above, wherein the peripheral storage portion a retractable tray slidably or pivotably mounted in the power adapter plug portion, the retractable tray being arranged to receive one or more peripheral components.

A portable electronic device as described above, wherein the one or more peripheral components is a pair of earphones.

A portable electronic device as described above, wherein the cable is arranged to convey an audio signal from the portable electronic device or a power signal to the portable electronic device.

A portable electronic device as described above, wherein the multifunction interface unit is permanently connected to the main body via the cable.

A portable electronic device as described above including a peripheral storage portion that is separate or separable from the multifunction interface unit.

A portable electronic device as described above, wherein the peripheral storage portion includes a data transfer component for inserting into a data communication port on another computing device to enable data communication between the portable electronic device and the other computing device.

A portable electronic device as described above including a controller portion for sending user instructions to the handset.

A portable electronic device as described above, wherein the main body includes a recessed channel around its side surfaces to store the cable.

A portable electronic device comprising: a main body, and a multifunction interface unit communicably connected to the main body via a cable, the multifunction interface unit providing a plurality of selectable functions, wherein the main body includes a recessed channel around its side surfaces to store the cable.

A portable electronic device as described above, wherein the cable is magnetically retainable in the recessed channel.

A portable electronic device as described above, wherein the cable includes a split portion comprising a pair of separable cable strands, wherein the pair of separable cable strands are arranged to be magnetically attracted together.

A portable electronic device as described above, wherein the cable comprises a flat sheath that encapsulates electrically conductive wiring.

A power adapter unit for a portable electronic device, the power adapter unit comprising: a plug body having a plurality of terminal pins shaped as spaced to be receivable in a mains power socket; a cable connected to the plug body for conveying an electrical signal received through the plurality of terminal pins; and a peripheral storage portion in the plug body, the peripheral storage portion being arranged to hold a peripheral component.

A power adapter unit as described above, wherein the peripheral component is a pair of earphones, whereby the peripheral storage portion includes a recess shaped to receive the earphones.

A power adapter unit as described above, wherein the peripheral storage portion includes one or more electric terminals that physical contact and electrically connect to corresponding electric connections on the peripheral component when mounted in the peripheral storage portion.

A peripheral cable interface for a portable electronic device, the peripheral cable interface comprising a body connectable between a peripheral component and the portable electronic device by a first cable and a second cable respectively, the body including: a first body portion having a first cable port for receiving the first cable, and a second body portion having a second cable port for receiving the second cable, wherein the first body portion and second body portion are rotatable relative to each one between a storage configuration in which the first cable port and second cable port are at the same end of the body and a use configuration in which the first cable port and second cable port are at different ends of the body.

A peripheral cable interface as described above including a user interface arranged to communicate user instructions to the portable electronic device.

A peripheral control interface as described above including a data transfer component for inserting into a port on another computing device to enable data communication between the portable electronic device and the other computing device.

A peripheral control interface as described above, wherein the data transfer component is a retractable plug on the first or second body portion.

The invention claimed is:

1. A portable electronic device comprising a main body, and a multifunction interface unit communicably connectable to the main body via a cable, wherein the main body includes a recess for storing the interface unit, wherein the multifunction interface unit comprises a power adapter plug portion and a user input/output unit which are both stowable in the recess, wherein the power adapter plug portion and the user input/output unit are connected by the cable, and wherein the multifunction interface unit is selectively operable as a power adapter when the user input/output unit is stowed in the recess and as a user input/output device when the power adapter plug portion is stowed in the recess.

2. A portable electronic device according to claim 1 including a mode selector arranged to configure the circuitry of the device according to a selected function of the multifunction interface unit.

3. A portable electronic device according to claim 2, wherein the mode selector is arranged to operate automatically based on a detected configuration of the multifunction interface unit.

4. A portable electronic device according to claim 1, wherein the multifunction interface unit comprises a peripheral device connected to the cable, the peripheral device being stowable in the power adapter plug portion.

5. A portable electronic device according to claim 4, wherein the power adapter plug portion includes a retractable storage tray mounted therein, wherein the peripheral device is securable in the storage tray.

6. A portable electronic device according to claim 4, wherein the peripheral device is a pair of earphones.

7. A portable electronic device according to claim 6, wherein the cable is arranged to convey an audio signal from the portable electronic device or a power signal to the portable electronic device.

8. A portable electronic device according to claim 1, wherein the multifunction interface unit comprises a data transfer connector connected to the cable at an end thereof opposite to the power adapter plug portion, wherein the recess in the main body of the portable electronic device is arranged to receive all of the power adapter plug portion, the cable and the data transfer component, and wherein the recess includes terminal connectors arranged so that the power adapter plug portion and the data transfer connector are operably connected to the portable electronic device when the multifunction interface unit is stowed in the recess.

9. A portable electronic device according to claim 1, further comprising a controller portion for sending user instructions to the main body of the portable electronic device.

10. A portable electronic device according to claim 1, wherein the cable is magnetically retainable in or on the main body.

11. A portable electronic device according to claim 10, wherein the cable comprises a flat sheath that encapsulates electrically conductive wiring and magnetic retention elements.

12. A portable electronic device according to claim 10, wherein the cable comprises a plurality of rigid portions that are retainable in a folded stack configuration for storage in the portable electronic device.

13. A power adapter unit for a portable electronic device, the power adapter unit comprising: a plug body portion having a plurality of terminal pins shaped and spaced to be connectable to an external power source; a cable connectable to the plug body portion for conveying electrical power received through the plurality of terminal pins; and a user input/output device connected to the cable to send or receive an electrical signal, wherein the user input/output device is stowable in the plug body portion, wherein the power adapter unit is selectively operable as one of the power adapter and the user input/output device, and wherein the cable is arranged to: convey a power signal from the plurality of terminal pins when the user input/output device is stowed, and convey a communication signal to the user input/output device when the user input/output device is not stowed.

14. A power adapter unit according to claim 13, wherein the plug body portion comprises a retractable storage tray for holding the user input/output device.

15. A power adapter unit according to claim 14, wherein the retractable storage tray is slidably or pivotably mounted in the plug body portion.

16. A power adapter unit according to claim 13, wherein the user input/output device is a pair of earphones, and the plug body portion includes a recess shaped to receive the earphones.

17. A power adapter unit according to claim 13, wherein the plug body portion includes one or more electric terminals that provide physical contact and electrical connection to the user input/output device when mounted in the plug body portion.

18. A power adapter unit according to claim 13, wherein the multifunction interface unit comprises a data transfer connector connected to the cable at an end thereof opposite to the plug body portion.

19. A power adapter unit according to claim 18, wherein the data transfer connector is a USB connector.

20. A portable electronic device according to claim 1, wherein the main body is a handset for a smartphone.

* * * * *